United States Patent
Esanu

[11] 3,717,636
[45] Feb. 20, 1973

[54] SALTS OF PYRIDOXINE MONO-ESTERS

[76] Inventor: Andre Esanu, 119 Rue de la Croix-Nivert, 75-Paris, France

[22] Filed: Jan. 13, 1971

[21] Appl. No.: 106,245

[30] Foreign Application Priority Data

Jan. 21, 1970 Great Britain....................2889/70

[52] U.S. Cl. .260/268 H, 260/295.5 R, 260/295.5 V, 260/297.5, 260/295 R, 424/263, 424/250
[51] Int. Cl. .............................................C07d 31/34
[58] Field of Search .....260/295 R, 295 VB, 295.5 V, 260/297.5

[56] References Cited

UNITED STATES PATENTS 3,557,131  1/1971  Yoshimura et al..............260/295.5 R

*Primary Examiner*—John D. Randolph
*Assistant Examiner*—Robert T. Bond
*Attorney*—Arnold Robinson

[57] ABSTRACT

Pyridoxine mono-esters salts, possessing psychostimulant properties and having the general formula:

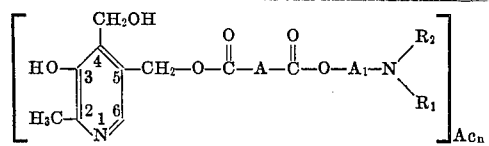

in which:

A and $A_1$ represent each an alkylene radical with a chain of up to 16 carton atoms or an aminohydrocarbon residue, for example an amino-alkylene residue such as

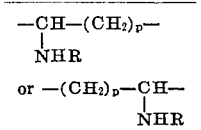

in which R represents a hydrogen atom or a $CH_3CO$ group,
$p$ being 1 or 2
$R_1$ and $R_2$ either represent each an alkyl radical containing up to five carbon atoms, said radicals being separated or forming with the nitrogen atom a heterocyclic ring.
Ac represents a pharmaceutically acceptable acid
$n$ is an integer taking the value 1,2 or 3

1 Claim, No Drawings

SALTS OF PYRIDOXINE MONO-ESTERS

This invention relates to pyridoxine mono-esters salts, and provides a new class of compounds having the general formula:

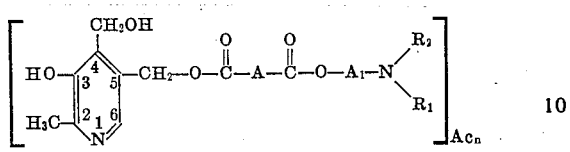

in which:

A and $A_1$ represent each an alkylene radical with a chain of up to 16 carbon atoms or an aminohydrocarbon residue, for example an amino-alkylene residue such as

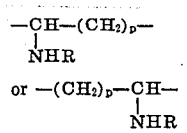

in which:

R represents a hydrogen atom or a $CH_3CO$ group, p being 1 or 2

$R_1$ and $R_2$ either represent each an alkyl radical containing up to five carbon atoms, said radicals being separated or forming with the nitrogen atom a heterocyclic ring.

Ac represents a pharmaceutically acceptable acid
n is an integer taking the value 1, 2 or 3

The salts of the esters according to this invention have therapeutic activity and may be prepared according to this invention by reacting pyridoxine —which has its 3- and 4- positions —OH and —$CH_2OH$ groups blocked—with a compound having the general formula $ClCO-A-OO-A_1-NR_1R_2$ in which the symbols are as above defined, followed by the liberation of the blocking of —OH and —$CH_2OH$ groups at the 3- and 4-positions of the pyridoxine ring. The esters thus obtained are then treated by a pharmaceutically acceptable acid to get an acceptable salt. The reaction sequence is illustrated below by way of example:

a. Blocking of two alcohol functions of pyridoxine:

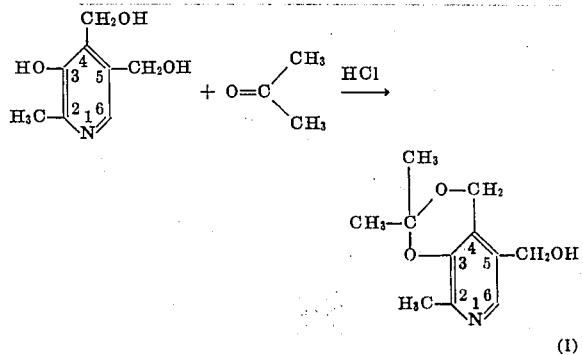

The resulting compound I is obtained in the form of its hydrochloride and is treated with $Na_2CO_3$ to obtain the free base. The choice of acetone is not critical: any usual blocking agent might be used alternatively.

b. Treatment of the compound obtained in a by the appropriate chloride acid:

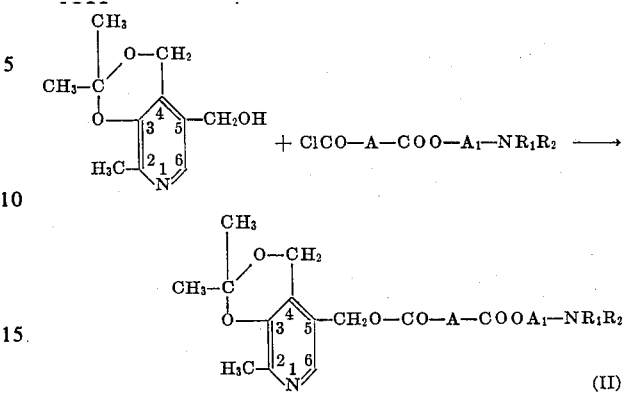

The hereinabove chloride may be obtained by the reaction of the anhydride of the corresponding acid with the substituted amino alkanol, to form the substituted amino alkanol mono-ester according to the reaction scheme:

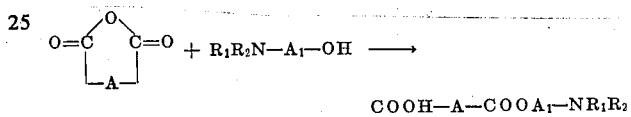

$$COOH-A-COOA_1-NR_1R_2$$

and this mono-ester, treated with $SOCl_2$, gives the chloride:

$$ClCO-A-COOA_1-NR_1R_2$$

c. Liberation of OH and $CH_2OH$ in 3- and 4- positions by treating compound (II) with an acid, to form a compound according to the invention:

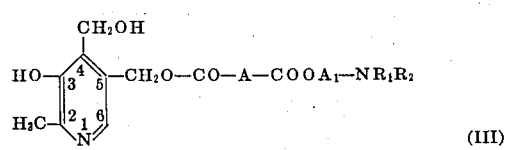

Another procedure might be used when acetone is replaced by a different blocking agent.

d. The compound (III) may optionally be reacted with an acid to give a pharmaceutically acceptable acid addition salt.

The following examples illustrate the invention.

I/ DIMETHYLAMINO ETHANOL AND 5-α PYRIDOXINE SUCCINATE a. Blocking of two alcohol functions of pyridoxine Into a 4 liter flask provided with a stirrer there were poured 2.1 liters of pure and anhydrous acetone, and 100 g of dried pyridoxine hydrochloride were added under stirring. The mixture was cooled whilst stirring at 0°C and then gaseous HCl was bubbled through the solution for 6 hours. After another hour the temperature was allowed to rise to room temperature and the stirring was maintained for a further hour. The mixture was then cooled to − 15°C and the corresponding 3,4-isopropylidene pyridoxine was obtained in the form of its hydrochloride (100 g). The free base was obtained by treatment with a solution of $Na_2CO_3$. 82 g of base (compound A) were obtained melting at 111°C.

b. Preparation and reaction of the chloride of dimethyl-amino ethanol mono-succinate 100 g of succinic anhydride, 100 g of dimethylamino ethanol and 100 ml of anhydridous acetone were placed into a two liter flask and were there refluxed for 3 hours. The solution was then concentrated to one third of its original volume by evaporation and cooled. A precipitate appeared, which was separated and recrystallized from acetone.

140 g of product were obtained, with a melting point of 78°C.

The chloride was prepared from this compound by treatment of 420 g of the compound with freshly distilled $SOCl_2$ (1.85 liter. After elimination of non-reacted $SOCl_2$, the product obtained was treated by benzene and dried, to yield 620 g of the hydrochloride of the chloride acid. 120 g of the compound of step (a) above (0.57 mole) were dissolved in 0.5 liter of pyridine. After cooling there were slowly added at about 5°C, during 90 minutes, 170 g (0.69 mole) of the hydrochloride previously obtained, dissolved in 0.2 liter of chloroform. The solution was stirred for 10 hours, then evaporated to dryness (350 g). The residue was dissolved in 0.3 liter of water and was neutralized by an aqueous solution of $NH_3$ saturated by $K_2CO_3$. There was obtained an oily substance which was extracted with chloroform. The extract was concentrated to dryness (170 g).

c. Liberation of OH and $CH_2OH$ in 3- and 4- positions by treating compound (II) with an acid, to form a compound according to the invention In this step the blocking group linking the OH in position 3 to the $CH_2OH$ in position 4 of the pyridoxine ring was broken by hydrolysis with formic acid. 52 g of the product of step (b) above were treated with 1.650 liter of 1 percent solution of formic acid and 0.250 liter of ethyl alcohol. The mixture was boiled for 30 minutes, evaporated again treated with ethyl alcohol and evaporated. There were obtained 37 g of an oily substance having the formula :

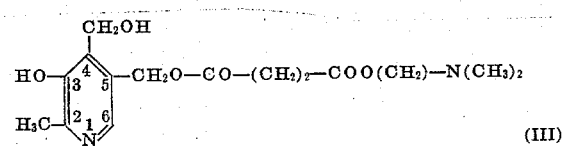

(III)

d. Salts formation
1. Maleate

Maleate was obtained by reacting 37 g (0.115 mole) of the above product of step (c) dissolved in 120 ml of acetone with 27 g (0.230 mole) of maleic acid dissolved in 130 ml of acetone.

Yield : 51 g

Melting point : 134°C

The furmarate was prepared by an exactly analogous process.

2. N-acetyl aspartate

The N-acetyl aspartate was obtained in an analogous manner to the preparation of the maleate by reacting 22 g (0.64 mole) of the substance of step (c) dissolved in 0.1 liter of ethyl alcohol with 22.4 g of N-acetyl aspartic acid (1.28 mole) dissolved in 0.3 liter of ethyl alcohol. The compound was very hygroscopic Yield : 31.5 g

II/DIMETHYLAMINO ETHANOL AND 5-αPYRIDOXINE GLUTARATE

Step (a) is identical to step (a) of example (I).

In step (b), glutaric anhydride is used instead of succinic anhydride.

Step (c) is similar to step (c) of example (I). There is thus obtained an oily substance which is treated by maleic acid as in step (d) of example (I). There is obtained an ochre-white crystalline product melting at 100°–102°C.

III/ N-METHYL N'-ETHANOL PIPERAZINE AND 5-α PYRIDOXINE SUCCINATE

Step (a) is the same as in example (I).

The mono-chloride of the mono-succinate of N-Methyl N'-ethanol piperazine is prepared by the same way as described in example (I) step (b), from the succinic anhydride and N-methyl N'-ethanol piperazine in stoecchiometric proportions refluxed in acetone (that leads to the mono-succinate of N-methyl N'-ethanol piperazine; melting point : 80°–82°C) and the further treatment of this compound by $SOCl_2$.

Step (c) is undertaken as in example (I) step (c) and there is obtained an oily substance with the yield of 73 percent. The analysis corresponds to the formula :

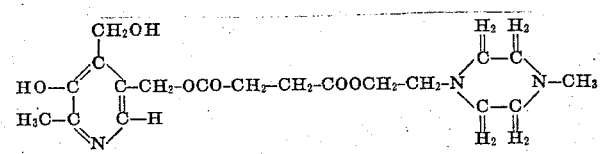

Step d

The compound of step (c) is transformed into a salt by the maleic acid (as in example I step d). With 3 molecules of maleic acid there is obtained the corresponding tri-maleate, a white product with a bitter and salted taste, melting at about 142°C.

These compounds have interesting psycho-stimulant properties as exemplified by Dimethylamino ethanol and 5-α pyridoxine succinate maleate. The compound shows at doses from 10 mg/kg, per os, an antagonist action against the hypothermic and ptosic action of reserpine. Moreover a very favorable action has been noticed on the dysfunctioning of the memory in rat and a high rate activity has been noticed on the cortex of the cat with doses of a level of 25 mg/kg I.V.

These compounds present also a low toxicity (in the case of the above mentioned compound it is : LD 50 on mice, 1.55 g/kg per os or 1.0 g/kg I.P.).

In human therapy, very good results have been obtained on patients suffering from psychastenia, neurotonic depressing syndrome, subjective cranial traumatic syndrome by a treatment comprising the administration, per diem, of 4 to 6 gelatin capsules containing each 0.250 g of the same compound. In all the cases of administration the tolerance has been perfect.

I claim:

1. A salt of a pyridoxine mono-ester having the following formula:

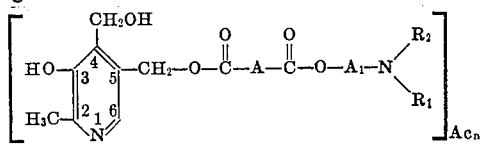

in which:
A represents an alkylene radical selected from —$CH_2$—$CH_2$— and —$CH_2$—$CH_2$—$CH_2$—
$A_1$ represents —$CH_2$—$CH_2$—$CH_2$—
$R_1$ and $R_2$ represent each an alkyl radical containing up to five carbon atoms, said radicals being separated or forming with the nitrogen atom a piperazine ring,
Ac represents a pharmaceutically acceptable acid,
$n$ is an integer taking the value 1, 2 or 3.

* * * * *

UNITED STATES PATENT OFFICE
CERTIFICATE OF CORRECTION

Patent No. 3,717,636　　　　　　　　　Dated February 20, 1973

Inventor(s) Andre Esanu

It is certified that error appears in the above-identified patent and that said Letters Patent are hereby corrected as shown below:

On the cover sheet before " [22] " insert:

-- [73] Assignee Societe d'Etudes de Produits

Chimiques Issy-Les-Moulineaux, France--

Signed and sealed this 5th day of March 1974.

(SEAL)
Attest:

EDWARD M. FLETCHER, JR.　　　　　　C. MARSHALL DANN
Attesting Officer　　　　　　　　　Commissioner of Patents